L. BURAS, Jr.
FISH HOOK EXTRACTOR.
APPLICATION FILED JUNE 3, 1910.
1,000,775.
Patented Aug. 15, 1911.
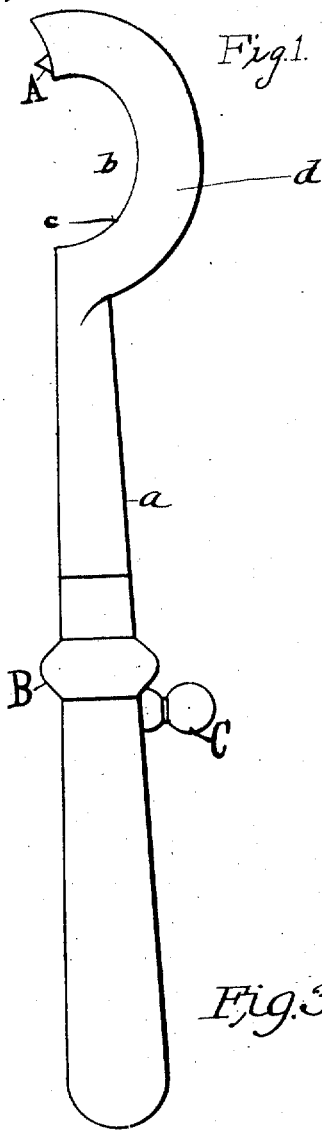
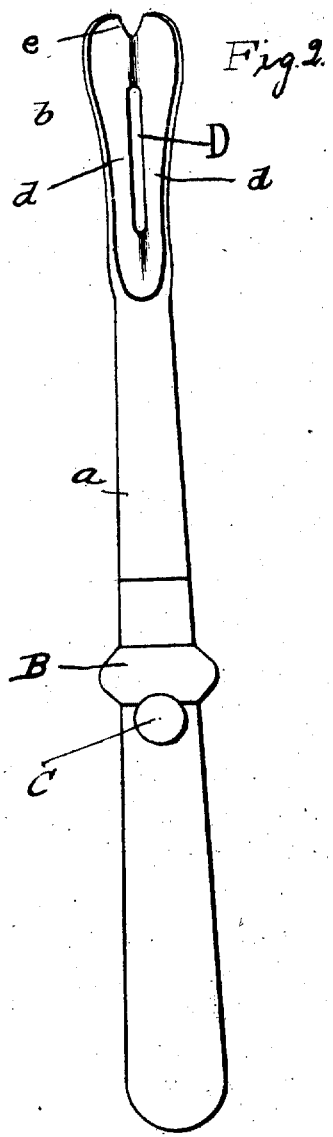
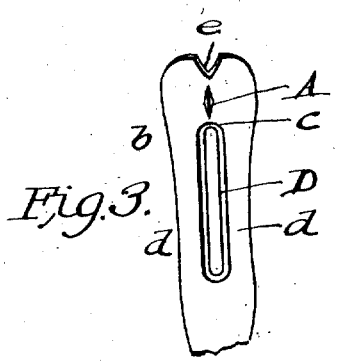
WITNESSES:
Ernest Fellen
James Brown
INVENTOR
Leon Buras Jr.

UNITED STATES PATENT OFFICE.

LEON BURAS, JR., OF VENICE, LOUISIANA.

FISH-HOOK EXTRACTOR.

1,000,775.

Specification of Letters Patent. Patented Aug. 15, 1911.

Application filed June 3, 1910. Serial No. 564,897.

*To all whom it may concern:*

Be it known that I, LEON BURAS, Jr., a citizen of the United States, residing at Venice, in the parish of Plaquemines, State of Louisiana, have invented a new and useful Fish-Hook Extractor, of which the following is a specification.

My present invention relates to implements for extracting hooks from the mouths of fishes, and consists in the implement, hereinafter described and claimed, for cutting the flesh in which the barbed end of the hook is engaged, to release the said barbed end, and then facilitating or rendering easy the withdrawal of the hook from the throat or mouth of the fish.

In the drawings accompanying and forming part of this specification: Figure 1 is a side elevation of my novel implement, and Fig. 2 is a back view of the same. Fig. 3 is a detail view showing the relative arrangement of the notch and knife of the implement.

Similar letters of reference designate corresponding parts in the views of the drawings.

The rigid handle $a$ of my novel implement is formed of any material or materials suitable to the purpose, and is preferably, though not necessarily, equipped at C with a lateral arm or projection.

Formed integral with or otherwise suitably fixed with respect to the forward end of the handle $a$ is the major portion $b$ of the implement head, which is preferably formed by bending a piece of sheet-metal into the shape shown in Figs. 1 and 2. Said major portion $b$ comprises a front edge portion $c$, and portions $d$ that diverge from said edge portion; and it is provided at its forward end with a notch $e$. I would also have it understood here that I prefer to provide the major portion $b$ in its front edge portion with a slot D, though the said slot is not essential to the successful use of the implement. In addition to the major portion $b$, the head of the implement comprises a knife blade A, fixed to the front edge of said major portion $b$ at the base of the notch $e$.

In the practical use of the implement, when a fish hook is caught in the throat or mouth of a fish, the operator holds the line portion or snood to which the hook is attached, and then places the implement head so that the snood or line portion is received between the divergent portions $d$, and inserts the head in the fish's mouth or throat until the bend of the fish hook is seated in the notch $e$. During the last part of the described movement of the implement, pressure is exerted thereagainst to cause the knife A to cut the flesh that holds the barbed end of the hook and release said barbed end; also, if necessary, the implement is given a twist to release the barbed end from the flesh. The operator then takes a turn of the line portion or snood to which the hook is attached about the arm or button C, making sure to draw the hook tight against the head of the implement, after which the engaged hook and implement head may be easily drawn from the mouth of the fish. The diverged or spread portions $d$ receive between them the shank portion of the hook and render it easy to move the knife A to and close alongside the barbed end of the hook for the purpose before stated.

While it is convenient to wrap the snood or line portion about the button C in the manner described, it is obvious that the line portion or snood may be held taut by the hand that grasps the handle of the implement, and that, therefore, the button C while preferred is not an essential element of my invention.

At B the handle $a$ of the implement is preferably, though not necessarily, provided with an enlargement.

It is obvious that in practice the implement may be made in various sizes.

Having described my invention, what I claim and desire to secure by Letters-Patent, is:

1. A fish hook extractor comprising a handle, and a head fixed thereto and having an edge portion and portions that diverge from said edge portion and also having a notch in the forward end of said edge portion and a knife fixed to and projecting from the edge portion, at a point adjacent said notch.

2. A fish hook extractor comprising a handle having a lateral arm or button at an intermediate point of its length; and a head fixed to said handle and having a slotted edge portion, and portions that diverge from said edge portion and also having a notch in the forward end of said edge portion and a knife fixed to and projecting from the edge portion, at a point adjacent said notch.

LEON BURAS, Jr.

Witnesses:
ERNEST FELLON,
JAMES BROWN.